United States Patent
Feng

(10) Patent No.: US 12,038,790 B2
(45) Date of Patent: Jul. 16, 2024

(54) DISPLAY DEVICE HAVING GEAR ARRANGED IN PARALLEL WITH KEYBOARD BOARD

(71) Applicant: WUHAN CHINA STAR OPTOELECTRONICS SEMICONDUCTOR DISPLAY TECHNOLOGY CO., LTD., Hubei (CN)

(72) Inventor: Zikang Feng, Hubei (CN)

(73) Assignee: WUHAN CHINA STAR OPTOELECTRONICS SEMICONDUCTOR DISPLAY TECHNOLOGY CO., LTD., Hubei (CN)

(*) Notice: Subject to any disclaimer, the term of this patent is extended or adjusted under 35 U.S.C. 154(b) by 0 days.

(21) Appl. No.: 17/595,208

(22) PCT Filed: Oct. 21, 2021

(86) PCT No.: PCT/CN2021/125145
§ 371 (c)(1),
(2) Date: Nov. 11, 2021

(87) PCT Pub. No.: WO2023/045003
PCT Pub. Date: Mar. 30, 2023

(65) Prior Publication Data
US 2024/0036614 A1    Feb. 1, 2024

(30) Foreign Application Priority Data
Sep. 22, 2021 (CN) .......................... 202111104961.3

(51) Int. Cl.
*G06F 1/16* (2006.01)
(52) U.S. Cl.
CPC .......... *G06F 1/1664* (2013.01); *G06F 1/1626* (2013.01); *G06F 1/1652* (2013.01)
(58) Field of Classification Search
CPC ...... G06F 3/016; G06F 1/1666; G06F 3/0238; G06F 3/04886; G06F 1/1652
See application file for complete search history.

(56) References Cited

U.S. PATENT DOCUMENTS 10,642,318 B1 * 5/2020 Lehmann ................ G06F 3/016
2012/0287051 A1   11/2012 Takabu

FOREIGN PATENT DOCUMENTS

| CN | 101599380 A | 12/2009 |
| CN | 104216471 A | 12/2014 |
| CN | 104679416 A | 6/2015 |
| CN | 206946432 U * | 1/2018 |

(Continued)

*Primary Examiner* — James Wu
*Assistant Examiner* — Dakota M Talbert
(74) *Attorney, Agent, or Firm* — Ladas & Parry LLP

(57) ABSTRACT

A display device is provided. The display device includes a housing, a flexible display screen arranged in the housing, and a keyboard assembly located between the housing and the flexible display screen. The keyboard assembly includes a driving component and a keyboard component. The flexible display screen and the keyboard component are fixedly connected, and the keyboard component is arranged up and down in the housing along a light emitting direction of the flexible display screen through the driving component.

14 Claims, 6 Drawing Sheets

A

(56) References Cited

FOREIGN PATENT DOCUMENTS

| CN | 206946432 U | 1/2018 |
|---|---|---|
| CN | 107704080 A | 2/2018 |
| CN | 112470108 A | 3/2021 |
| CN | 112905018 A | 6/2021 |

* cited by examiner

DISPLAY DEVICE HAVING GEAR ARRANGED IN PARALLEL WITH KEYBOARD BOARD

FIELD OF INVENTION

The present application relates to the field of display devices, and more particularly to a display device.

BACKGROUND OF INVENTION

At present, carrying flexible screen technology has become a new and popular direction in the mobile phone/notebook market. With the development of flexible screen technology, a variety of flexible screen terminal applications have emerged on the market.

For a mobile terminal equipped with a foldable flexible screen, a virtual touch keyboard provided by the flexible screen cannot provide a touch and press feedback provided by a physical keyboard. Therefore, it is difficult for a user to quickly enter a touch type by touching and tapping feedback. This leads to reduced efficiency when users use mobile terminals equipped with foldable flexible screens for typing input.

Technical Problem

The current flexible screen has the technical problem that it cannot provide the touch and press feedback provided by the physical keyboard, which leads to a decrease in the efficiency of the user's typing input.

SUMMARY OF INVENTION

The present application provides a display device to improve a current technical problem of low efficiency when users use a mobile terminal equipped with a foldable flexible screen for typing input.

The present application provides a display device including a housing, a flexible display screen arranged in the housing, a keyboard assembly located between the housing and the flexible display screen, wherein the keyboard assembly comprises a driving component and a keyboard component, and the flexible display screen and the keyboard component are fixedly connected. The keyboard component is arranged up and down in the housing along a light emitting direction of the flexible display screen through the driving component.

In the display device of the present application, the keyboard component comprises a keyboard board and a plurality of elastic keyboards arranged on the keyboard board.

In the display device of the present application, the flexible display screen comprises a plurality of typing parts corresponding to the elastic keyboards, and the elastic keyboards are connected to the typing parts.

In the display device of the present application, the elastic keyboards and the typing parts are arranged up and down in the housing along the light emitting direction of the flexible display screen through the driving component.

In the display device of the present application, the elastic keyboard comprises a keyboard housing and an elastic component arranged in the keyboard housing.

In the display device of the present application, a first end of the keyboard housing is connected with the keyboard board, and a second end of the keyboard housing is opened and connected with the typing part.

In the display device of the present application, the elastic keyboard further comprises a pressing piece arranged in the keyboard housing.

In the display device of the present application, a first side surface of the pressing piece is fixedly connected to the typing part, and a second side surface of the pressing piece is fixedly connected to the elastic component or the keyboard housing.

In the display device of the present application, the driving component comprises a plurality of lifting struts and a plurality of driving parts, and the driving parts correspond to the lifting struts one-to-one.

In the display device of the present application, the lifting struts are located on a side of the keyboard board away from the flexible display screen.

In the display device of the present application, a first end of the lifting strut is connected with the keyboard board, and a second end of the lifting strut is connected with the driving part.

In the display device of the present application, the lifting strut is arranged up and down along the light emitting direction of the flexible display screen under an action of the driving part.

In the display device of the present application, the driving part comprises a motor and a first gear, and the motor drives the first gear to rotate around a central axis.

In the display device of the present application, the lifting strut comprises a threaded rod, a threaded hole is provided in a center of the first gear, and the threaded rod is threadedly fitted with the threaded hole.

In the display device of the present application, the driving part further comprises a second gear, the second gear meshes with the first gear, and an output end of the motor is connected with a center of the second gear.

In the display device of the present application, the second gear is arranged in parallel with the keyboard board, a limiting piece is arranged on a side surface of the second gear close to the keyboard board, and the limiting piece is pressed on the first gear.

In the display device of the present application, the flexible display screen comprises a first plane part, a second plane part, and a bent part connecting the first plane part and the second plane part.

In the display device of the present application, the housing comprises a first housing corresponding to the first plane part, a second housing corresponding to the second plane part, and an intermediate housing connected to the first housing and the second housing and corresponding to the bent part.

In the display device of the present application, the typing part is located in the first plane part or the second plane part.

In the display device of the present application, edges of the intermediate housing close to the first housing and the second housing are set as arc-shaped surfaces.

Beneficial Effect:

In the present application, the keyboard assembly is arranged between the housing and the flexible display screen, so that the keyboard component in the keyboard assembly can be up and down along the light emitting direction of the flexible display screen under the action of the driving component. When the user needs to input, the keyboard component is raised to a side of the flexible display screen or lowered to a side away from the flexible display screen. A surface of the flexible display screen is formed into a "raised keyboard" or "recessed keyboard" corresponding to the keyboard component. Therefore, a mobile terminal equipped with the foldable flexible screen can provide the user with a touch and press feedback provided by a physical keyboard, which is convenient for the user to perform fast input by blind typing, and improves the efficiency of typing input.

DESCRIPTION OF DRAWINGS

In order to explain the technical solution in the present application more clearly, the following will briefly introduce the drawings that need to be used in the description of the embodiments. Obviously, the drawings in the following description are only some embodiments of the present application. For those skilled in the art, other drawings can be obtained based on these drawings without creative work.

DESCRIPTION OF REFERENCE SIGNS

Figure 1:
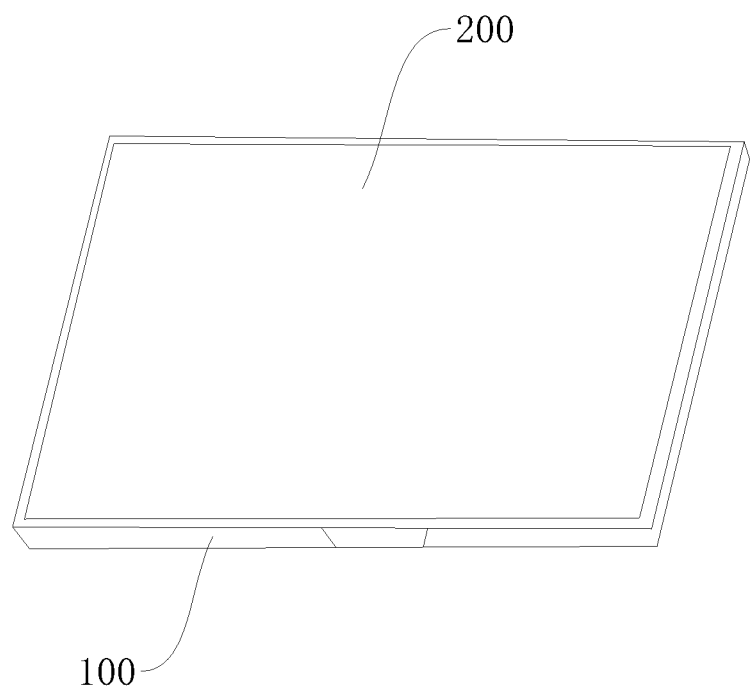
FIG. 1 is a schematic diagram of an overall structure of a display device in a flat state according to the present application.

Housing 100, first housing 110, second housing 120, intermediate housing 130, first support plate 140, second support plate 150, keyboard hole 160, support component 170, flexible display screen 200, first plane part 210, second plane part 220, bent part 230, typing part 240, driving component 300, lifting strut 310, driving part 320, motor 321, first gear 322, second gear 323, limiting piece 324, keyboard component 400, keyboard board 410, elastic keyboard 420, keyboard housing 421, elastic component 422, and pressing piece 423.

DETAILED DESCRIPTION OF PREFERRED EMBODIMENTS

The technical solutions in the embodiments of the present application will be clearly and completely described below in conjunction with the drawings in the embodiments of the present application. Obviously, the described embodiments are only a part of the embodiments of the present application, rather than all the embodiments. Based on the embodiments in the present application, all other embodiments obtained by those skilled in the art without creative work shall fall within the protection scope of the present application. In addition, it should be understood that the specific implementations described here are only used to illustrate and explain the present application, and are not used to limit the present application. In the present application, unless otherwise stated, the directional words used such as "upper" and "lower" generally refer to the upper and lower directions of the device in actual use or working state, and specifically refer to the drawing directions in the drawings. Further, "inner" and "outer" refer to the outline of the device.

In a mobile terminal equipped with a foldable flexible screen, a virtual touch keyboard provided by the flexible screen cannot provide a touch and press feedback provided by a physical keyboard. Therefore, it is difficult for users to perform touch typing and quick input through tactile feedback and tapping feedback. This leads to reduced efficiency when users use mobile terminals equipped with foldable flexible screens for typing input. The present application proposes the following solutions based on the above technical problems.

Please refer to FIG. 1 to FIG. 11. The present application provides a display device including a housing 100, a flexible display screen 200 arranged in the housing 100, and a keyboard assembly located between the housing 100 and the flexible display screen 200. The keyboard assembly includes a driving component 300 and a keyboard component 400, and the flexible display screen 200 is fixedly connected to the keyboard component 400.

The keyboard component 400 is arranged up and down in the housing 100 along a light emitting direction of the flexible display screen 200 through the driving component 300.

Figure 4:
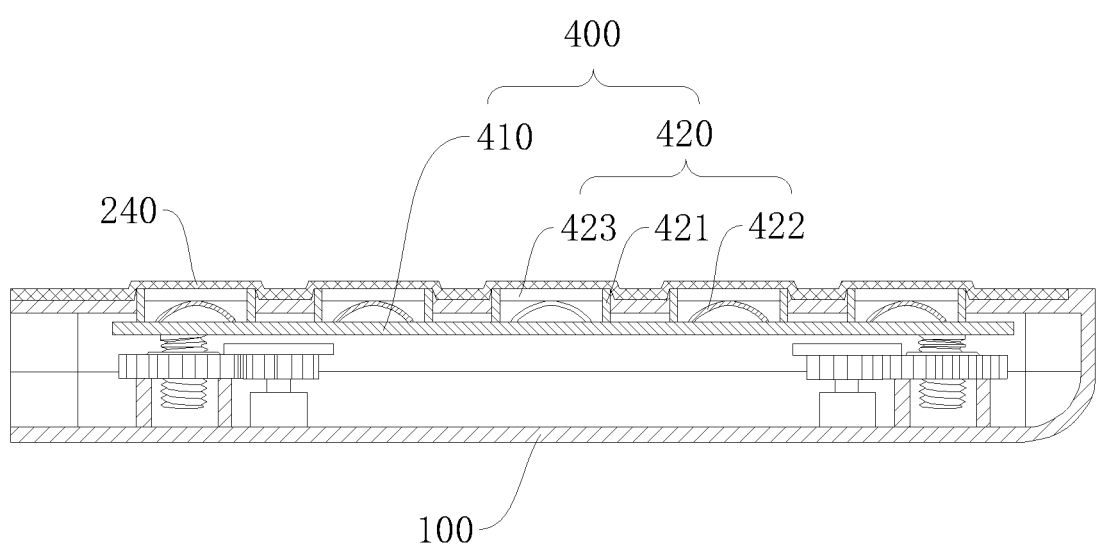
FIG. 4 is a schematic structural diagram of a keyboard assembly in a second state according to the present application.
Figure 5:
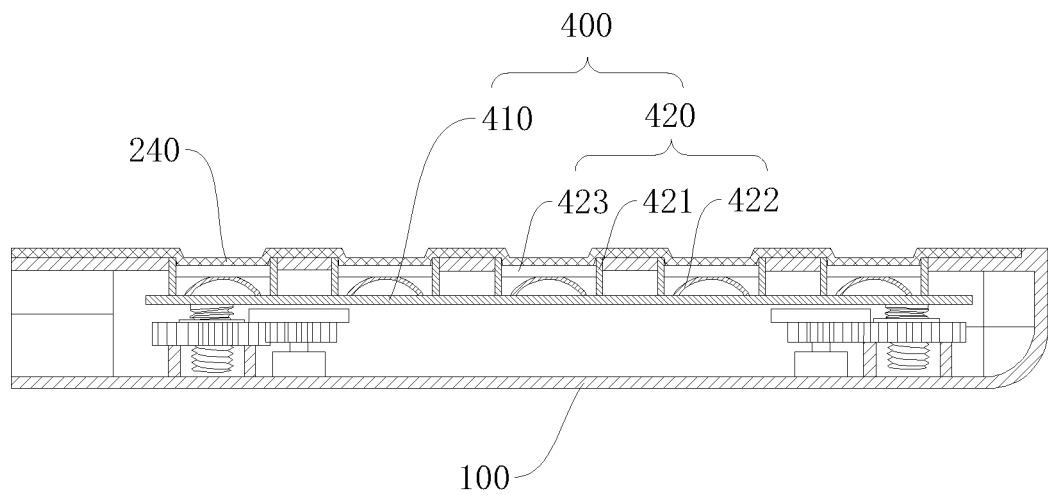
FIG. 5 is a schematic structural diagram of a keyboard assembly in a third state according to the present application.
Figure 6:
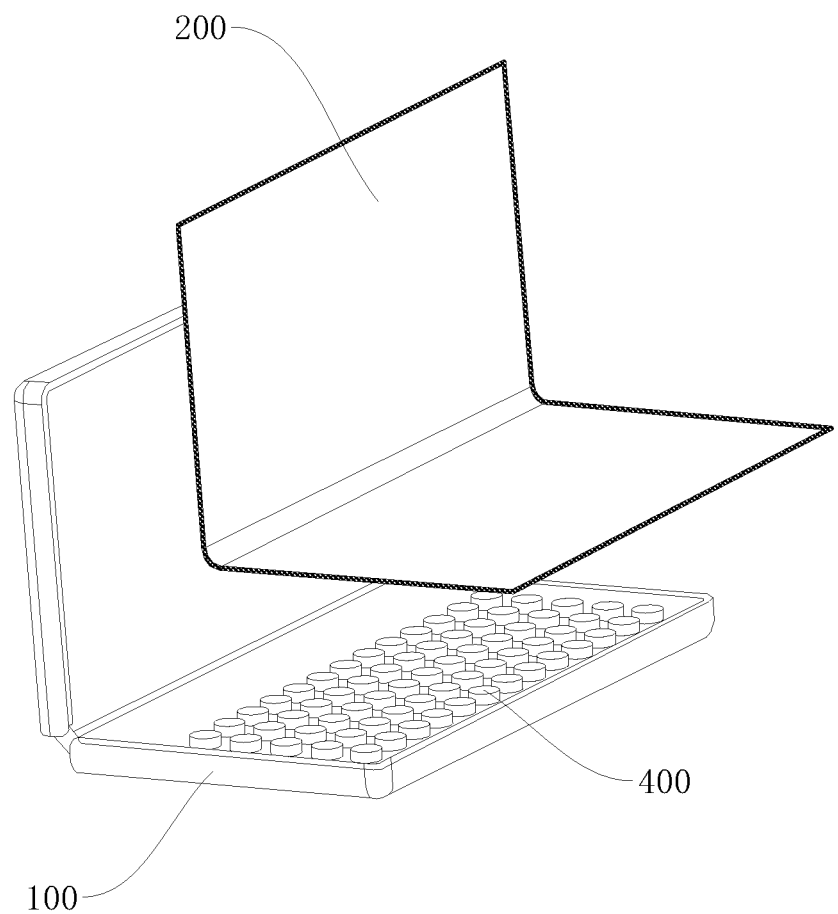
FIG. 6 is a schematic diagram of an exploded structure of a display device described in the present application.

In this embodiment, the keyboard assembly is arranged between the housing 100 and the flexible display screen 200, so that the keyboard component 400 in the keyboard assembly can be lifted and lowered along the light emitting direction of the flexible display screen 200 under the action of the driving component 300. When the user needs to input, the corresponding flexible display screen 200 can be lifted to a light emitting side or pulled down to a backlight side through the keyboard component 400. A "raised keyboard" (as shown in FIG. 4) or a "recessed keyboard" (as shown in FIG. 5) corresponding to the keyboard component 400 is formed on a surface of the flexible display screen 200. Therefore, a mobile terminal equipped with the foldable flexible screen can provide the user with a touch and press feedback provided by a physical keyboard, which is convenient for the user to perform fast input by blind typing, and improves efficiency of typing input.

In this embodiment, the housing 100 may be made of hard rigid materials such as metals, alloys and other materials. The housing 100 is a housing with a rectangular parallelepiped shape and a hollow inside. The flexible display screen 200 is disposed on one end surface of the housing 100.

In this embodiment, the flexible display 200 may be one of OLED, mini-LED, and micro-LED flexible displays 200.

The technical solution of the present application will now be described in conjunction with specific embodiments. It should be noted that the order of description in the following embodiments is not intended to limit the preferred order of the embodiments.

Figure 2:
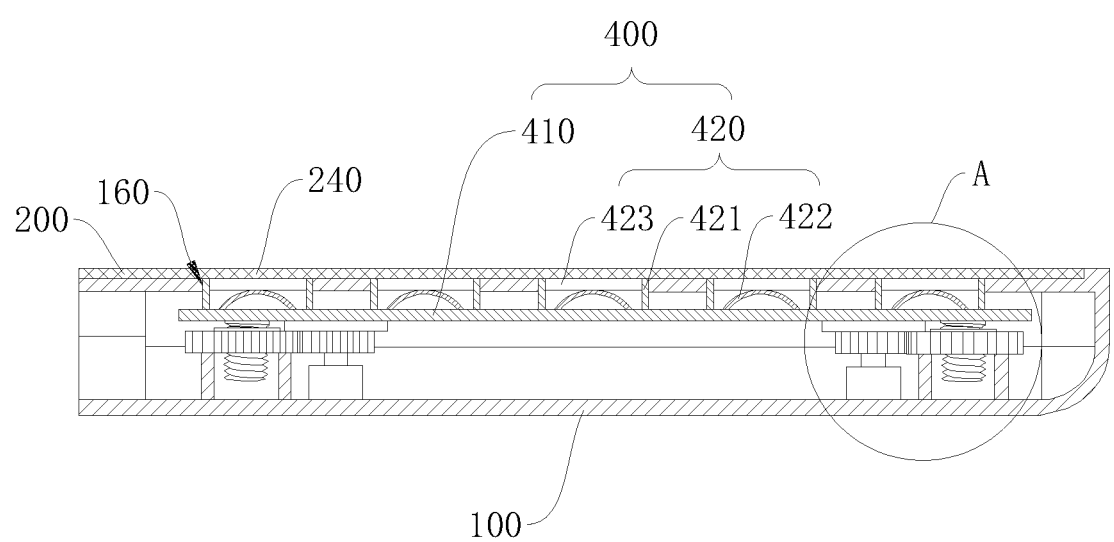
FIG. 2 is a schematic structural diagram of a keyboard assembly in a first state according to the present application.

Please refer to FIG. 2, in the display device of the present application, the keyboard component 400 includes a keyboard board 410 and a plurality of elastic keyboards 420 arranged on the keyboard board 410. A shape of the keyboard board 410 may be rectangular. The keyboard board 410 may be made of metal materials, hard plastics or other rigid and light materials.

In this embodiment, the flexible display screen 200 includes a plurality of typing parts 240 corresponding to the flexible keyboard 420. The elastic keyboard 420 is connected to the typing part 240. A plurality of keyboard holes 160 are provided on an end surface of the housing 100 in contact with the flexible display screen 200. The plurality of keyboard holes 160 correspond to the plurality of elastic keyboards 420 one-to-one. The elastic keyboard 420 passes through the keyboard hole 160 and is fixedly connected to the typing part 240. The elastic keyboard 420 and the typing part 240 are arranged up and down in the housing 100 along the light emitting direction of the flexible display screen 200 through the driving component 300. In this embodiment, through the above arrangement, a plurality of elastic keyboards 420 are connected to the driving component 300 through the keyboard board 410. The multiple elastic keyboards 420 realize synchronous lifting, so that the multiple typing parts 240 of the flexible display screen 200 can form a "physical keyboard" structure with uniform height or depth. This is beneficial to improve a user's typing experience and increase a typing speed when the user taps the typing part 240. The elastic keyboard 420 in this embodiment can provide the user with a touch and press feedback provided by a physical keyboard, which facilitates the user to perform a quick input of blind typing, and further improves an efficiency of typing input.

Please refer to FIG. 2, in the display device of the present application, the elastic keyboard 420 includes a keyboard housing 421 and an elastic component 422 disposed in the keyboard housing 421. A first end of the keyboard housing 421 is fixedly connected to the keyboard board 410. A second end of the keyboard housing 421 is opened and is fixedly connected to the typing part 240.

In this embodiment, the keyboard housing 421 may be a cubic housing with a hollow inside, or may also be a cylindrical housing with a hollow inside. The specific shape of the keyboard housing 421 is not specifically limited in the present application.

In this embodiment, the keyboard housing 421 may be made of a lightweight and rigid plastic or metal material.

In this embodiment, a first end of the keyboard housing 421 may be welded or glued to the keyboard board 410, or the keyboard housing 421 may be integrally formed with the keyboard board 410.

In this embodiment, a second end of the keyboard housing 421 may be adhesively connected to the typing part 240 of the flexible display screen 200.

In this embodiment, the elastic component 422 may be an elastic piece with an arc top shape, so that it has a certain amount of space for deformation and restoration of deformation. A bottom edge of the elastic piece is fixed on the keyboard board 410, and a highest point of the top of the elastic piece is flush with the second end of the keyboard housing 421.

In this embodiment, the elastic piece may be made of a metal material or other elastic materials with good deformation recovery ability.

In this embodiment, an elastic component 422 is provided in the keyboard housing 421, so that when the user needs to perform typing input operations, the flexible display screen 200 can be lifted to the light emitting side or pulled down to the backlight side through the keyboard housing 421 to form a "keyboard" basis for users to perform touch typing operations. The elastic component 422 provided in the keyboard housing 421 can provide the user with touch and press feedback, give the user the same operating experience as a real keyboard, and further improve the user's typing input speed.

Please refer to FIG. 2, in the display device of the present application, the elastic keyboard 420 further includes a pressing piece 423 disposed in the keyboard housing 421. The shape of the pressing piece 423 may be the same as the shape of an opening end surface at the second end of the keyboard housing 421. An area of the pressing piece 423 is slightly smaller than an area of the opening end surface of the keyboard housing 421.

In this embodiment, the pressing piece 423 is arranged parallel to the keyboard board 410.

In this embodiment, a first side surface of the pressing piece 423 may be fixedly connected to the typing part 240. A second side surface of the pressing piece 423 can be glued and fixed to the elastic component 422. The first side surface is a side surface of the pressing piece 423 close to the keyboard board 410. The second side surface is a side surface of the pressing piece 423 away from the keyboard board 410.

In this embodiment, the second side surface may also be a peripheral side surface where the pressing piece 423 contacts the keyboard housing 421. The second side surface is glued and fixed to an inner wall of the keyboard housing 421.

In this embodiment, the pressing piece 423 may be made of a light and hard plastic piece or a metal piece.

In this embodiment, by providing a pressing piece 423 between the elastic component 422 and the typing part 240, the pressing piece 423 can play a good transitional effect between the typing part 240 and the elastic component 422. The pressing piece 423 provides a more stable pressing basis for the typing part 240, and further increases a force-receiving area of the elastic component 422 when the typing part 240 is hit. The elastic component 422 is uniformly deformed, so as to better provide the user with touch and press feedback, which is beneficial for the user to increase the speed of typing input.

Figure 3:
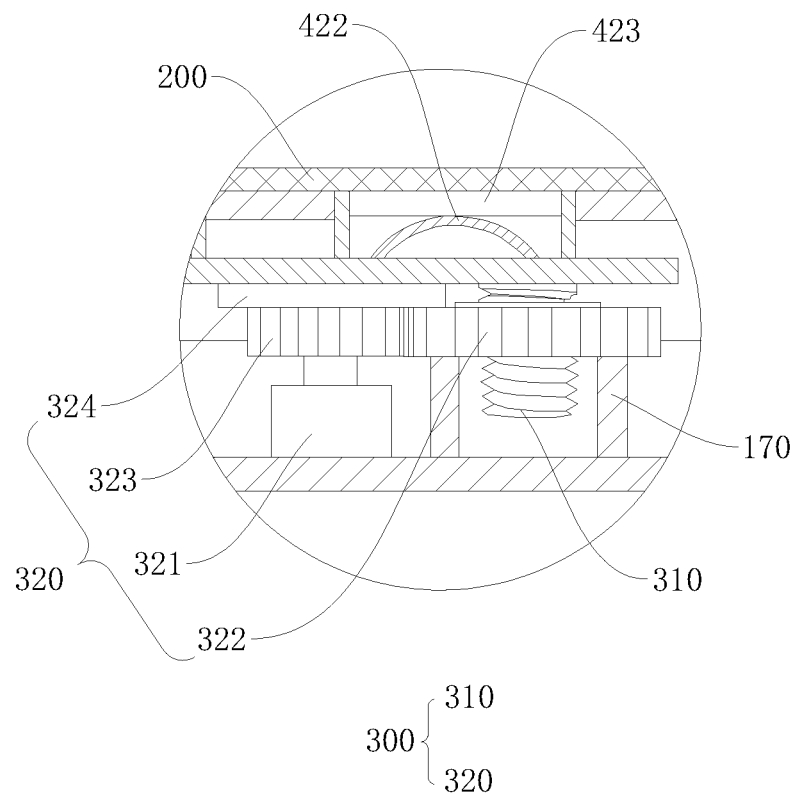
FIG. 3 is a schematic diagram of an enlarged structure of area A in FIG. 2.

Please refer to FIG. 3, in the display device of the present application, the driving component 300 includes a plurality of lifting struts 310 and a plurality of driving parts 320. The driving parts 320 correspond to the lifting struts 310 one-to-one. The lifting strut 310 is located on a side of the keyboard board 410 away from the flexible display screen 200. The lifting strut 310 is arranged perpendicular to the keyboard board 410.

In this embodiment, a first end of the lifting strut 310 and the keyboard board 410 may be rotatably connected through a bearing. A second end of the lifting strut 310 is connected to the driving part 320. The lifting strut 310 is arranged up and down along the light emitting direction of the flexible display screen 200 under the action of the driving part 320.

In this embodiment, a plurality of lifting struts 310 and the driving parts 320 are provided, so that when a user needs to perform typing input, a plurality of lifting struts 310 are driven by a plurality of driving parts 320 to move up and down synchronously along the light emitting direction of the flexible display screen 200. This not only helps to improve stability of an internal structure of the display device, but also makes the typing part 240 on the flexible display screen 200 more uniform and stable, providing users with good input conditions.

In this embodiment, it is assumed that the driving component 300 includes four lifting struts 310 and four driving parts 320 as an example. The four lifting struts 310 and the four driving parts 320 may be respectively arranged at the four end corners of the keyboard board 410. As a result, the keyboard board 410 is stably supported, and the lifting of the keyboard board 410 is more stable.

It should be noted that the number and location of the lifting struts 310 and the driving parts 320 in the driving component 300 in the present application can be adjusted according to the size of the keyboard board 410, which is not specifically limited in the present application.

Please refer to FIG. 3, in the display device of the present application, the driving part 320 includes a motor 321 and a first gear 322. The motor 321 drives the first gear 322 to rotate around a central axis. The lifting strut 310 includes a threaded rod. A center of the first gear 322 is provided with a threaded hole penetrating through it. A diameter of the threaded hole is the same as a rod diameter of the threaded hole, and a thread in the threaded hole is matched with a thread on the threaded rod.

In this embodiment, the motor 321 may be a small or micro servo motor 321. An output end of the motor 321 can drive the first gear 322 to rotate around its central axis through a transmission structure (such as a gear, a bevel gear, a worm, etc.).

In this embodiment, the first gear 322 is arranged parallel to the keyboard board 410, that is, the center axis of the first gear 322 is perpendicular to the keyboard board 410.

In this embodiment, the housing 100 is provided with a support component 170 for supporting the first gear 322. The support component 170 may be a rigid support cylinder with two ends open and a hollow inside. The rigid support cylinder may be integrally formed with the housing 100. An internal cavity space of the rigid support cylinder can be used to accommodate the threaded rod.

In this embodiment, the central axis of the rigid support cylinder coincides with the central axis of the first gear 322. The first end of the rigid support cylinder is fixed to the inner wall of the housing 100. The second end of the rigid support cylinder is movably connected with the first gear 322. Specifically, the side of the first gear 322 away from the keyboard board 410 abuts against the second end of the rigid support cylinder, so as to realize the rotation of the first gear 322 on the rigid support cylinder.

In this embodiment, in order to prevent the first gear 322 from shifting on the rigid support cylinder, the side of the first gear 322 away from the keyboard board 410 may also be provided with an annular groove (not shown in the figure) fitted with the second end of the rigid support cylinder.

In this embodiment, a driving part 320 including a motor 321 and a first gear 322 is provided. The motor 321 can drive the first gear 322 to rotate through a transmission structure (such as a gear, a bevel gear, a worm, etc.). The first gear 322 then drives the threaded rod to rise and fall along the light emitting direction of the flexible display screen 200 through the threaded cooperation between the threaded hole at the center and the threaded rod, so as to realize the lifting of the keyboard component 400. This driving process has good stability, and makes the lifting and lowering of the keyboard component 400 relatively smooth. This prevents a sudden rise or fall of the keyboard component 400 from causing structural damage to the flexible display screen 200.

Please refer to FIG. 3, the driving part 320 may further include a second gear 323. The second gear 323 meshes with the first gear 322, and the output end of the motor 321 is fixedly connected to the center of the second gear 323.

In this embodiment, the second gear 323 is also arranged in parallel with the keyboard board 410. In other words, the second gear 323 is arranged parallel to the central axis of the second gear 323. The motor 321 is fixedly arranged in the housing 100 and the output end of the motor 321 is fixedly connected to the center of the second gear 323.

In this embodiment, a thickness of the second gear 323 in a direction of a central axis is equal to a thickness of the first gear 322 in the direction of the central axis. The second gear 323 is flush with a surface of the first gear 322.

In this embodiment, the second gear 323 is provided so that the motor 321 can drive the first gear 322 through the second gear 323, thereby achieving the effect of driving the first gear 322 to rotate without hindering the lifting of the threaded rod.

Referring to FIG. 3, in this embodiment, in order to further restrict the position of the first gear 322 on the support component 170, the second gear 323 is also provided with a limiting piece 324 on the side surface close to the keyboard board 410. The limiting piece 324 may be a round metal piece or a round plastic piece or the like arranged parallel to the second gear 323. The edge of the limiting piece 324 protrudes from the edge of the second gear 323. The limiting piece 324 can abut against the side surface of the first gear 322 close to the keyboard board 410. This allows the edge of the limiting piece 324 to be pressed against the surface of the first gear 322 close to the keyboard board 410 to play a limiting role.

In this embodiment, a limiting piece 324 is provided on the side surface of the second gear 323 close to the keyboard board 410. The limiting piece 324 can cooperate with the support component 170 to play a dual limiting role on the first gear 322. This stabilizes the spatial position of the first gear 322 inside the housing 100 and improves the stability of the internal structure of the display device.

Referring to FIG. 6 to FIG. 11, in the display device of the present application, the flexible display screen 200 includes a first plane part 210, a second plane part 220, and a bent part 230 connecting the first plane part 210 and the second plane part 220. The typing part 240 is located in the first plane part 210 or the second plane part 220.

Figure 7:
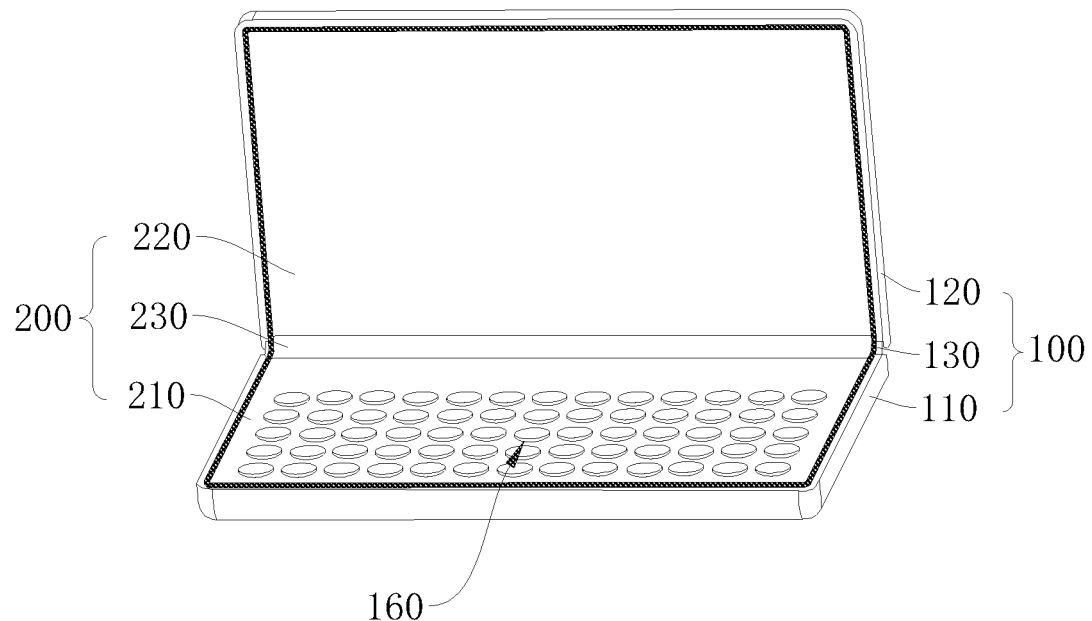
FIG. 7 is a schematic diagram of an overall structure of a display device when a keyboard film set is raised according to the present application.
Figure 8:
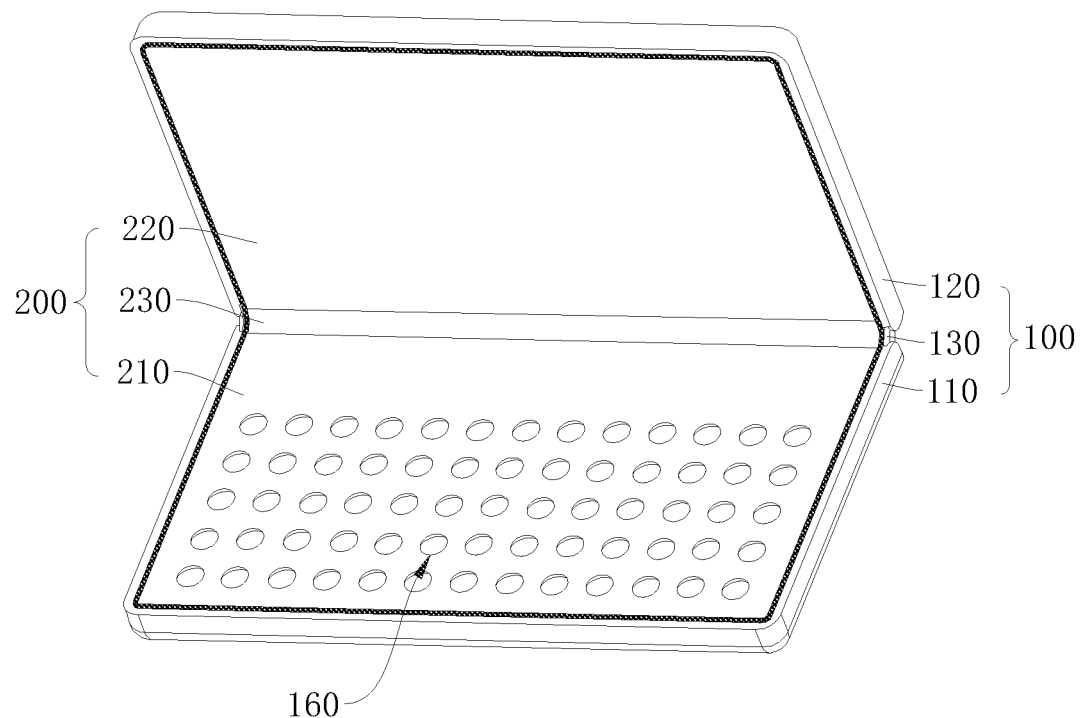
FIG. 8 is a schematic diagram of an overall structure of a display device when a keyboard film set is recessed according to the present application.

Please refer to FIG. 7 and FIG. 8, in this embodiment, the housing 100 includes a first housing 110 corresponding to the first plane part 210, a second housing 120 corresponding to the second plane part 220, and an intermediate housing 130 connected to the first housing 110 and the second housing 120 and corresponding to the bent part 230. A first side of the intermediate housing 130 is located between the first plane part 210 and the first housing 110. A second side of the intermediate housing 130 is located between the second plane part 220 and the second housing 120. The intermediate housing 130 may be a housing with a hollow inside and a rectangular parallelepiped shape. An installation direction of the rectangular parallelepiped housing is consistent with an extending direction of the bent part 230.

In this embodiment, the intermediate housing 130 is disposed facing an opening of an end surface of the bent part 230. This facilitates the provision of a transmission mechanism (not shown in the figure) for folding the first housing 110 and the second housing 120 in the intermediate housing 130.

Figure 9:
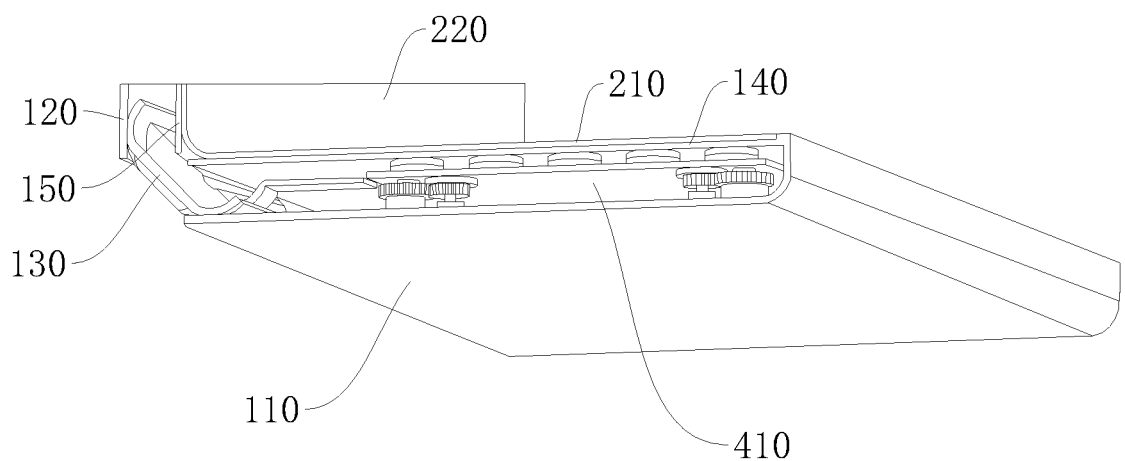
FIG. 9 is a schematic structural diagram of a housing according to the present application.

Referring to FIG. 9, in this embodiment, the housing 100 further includes a first support plate 140 disposed on the first housing 110 and a second support plate 150 disposed on the second housing 120. The flexible display screen 200 is disposed on the first support plate 140 and the second support plate 150. In this embodiment, the first support plate 140 and the second support plate 150 are spaced apart. A first end of the first support plate 140 is fixedly connected to an end of the first housing 110 away from the second housing 120. A second end of the first support plate 140 extends to a side of the second housing 120 into the intermediate housing 130. The first end of the second support plate 150 is fixedly connected to the end of the second housing 120 away from the first housing 110. The second end of the second support plate 150 extends to the side of the first housing 110 into the intermediate housing 130. A gap is left between the second end of the first support plate 140 and the second end of the second support plate 150.

In this embodiment, the keyboard hole 160 may be provided on the first support plate 140 or the second support plate 150 as long as it corresponds to the position of the elastic keyboard 420.

Figure 10:
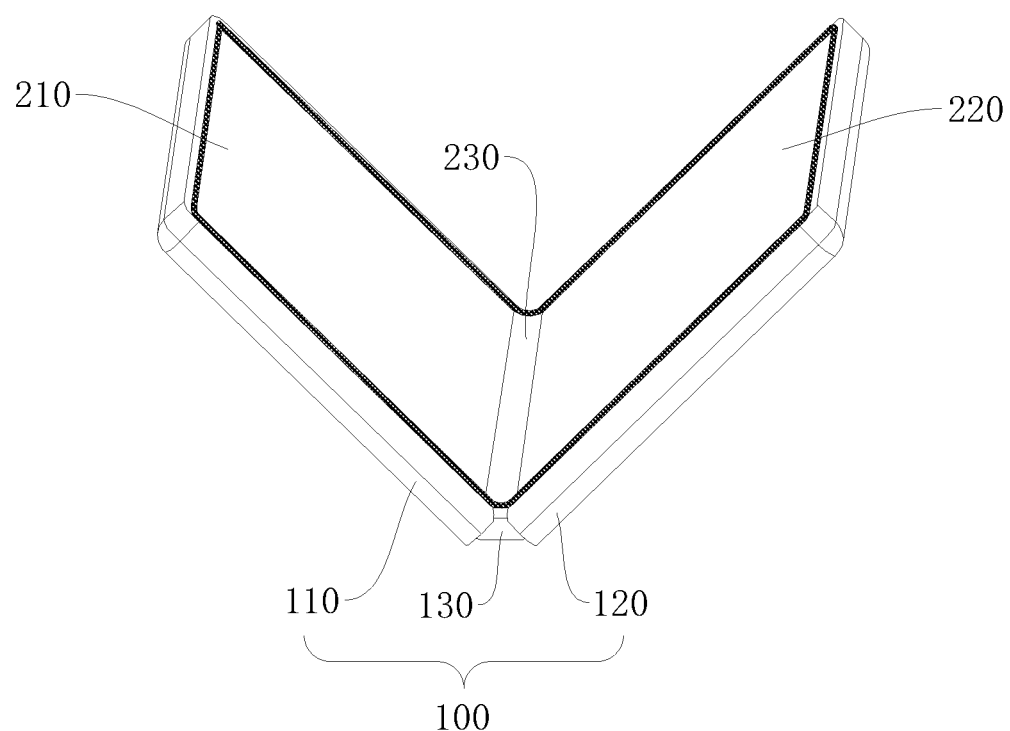
FIG. 10 is a schematic diagram of an overall structure of a display device in a half-folded state according to the present application.
Figure 11:
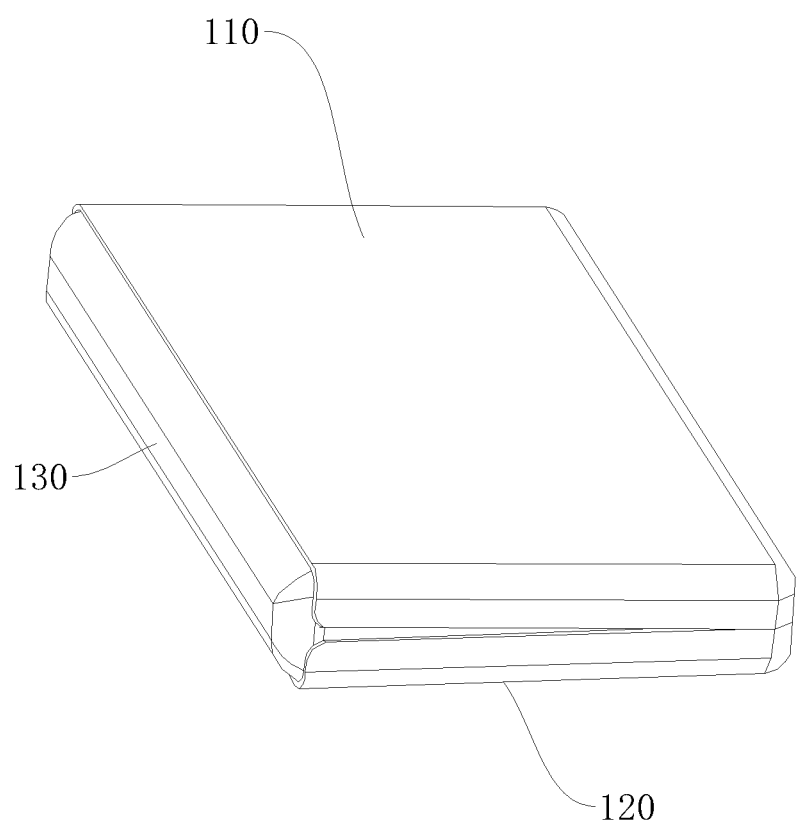
FIG. 11 is a schematic diagram of an overall structure of a display device in a fully folded state according to the present application.

Please refer to FIG. 10 and FIG. 11, in this embodiment, edges of contact surfaces of the intermediate housing 130, the first housing 110, and the second housing 120 are all arc-shaped. This facilitates relative sliding between the intermediate housing 130, the first housing 110, and the second housing 120. The intermediate housing 130 is provided with a transmission mechanism (not shown in the figure) that connects the first housing 110 and the second housing 120. The transmission mechanism can drive and connect the first housing 110 and the second housing 120 to realize a relative rotation between the first housing 110 and the second housing 120 and realize a folding function.

In the present embodiment, the display device may be a smart electronic device such as a mobile phone, a notebook computer, or a tablet computer.

In this application, a keyboard assembly is provided between the housing 100 and the flexible display screen 200. The keyboard component 400 in the keyboard assembly can be raised and lowered along the light emitting direction of the flexible display screen 200 under the action of the driving component 300. The user raises the keyboard component 400 toward the side of the flexible display screen 200 or lowers it toward the side away from the flexible display screen 200 when input is required. The surface of the flexible display screen 200 is formed with a "raised keyboard" or a "recessed keyboard" corresponding to the keyboard component 400. Therefore, the mobile terminal equipped with the foldable flexible screen can provide the user with the touch and press feedback provided by the physical keyboard, which is convenient for the user to perform fast input by blind typing, and improves the efficiency of typing input.

A detailed description of the display device provided by the embodiment of the present application is given above. Specific examples are used in this article to illustrate the principle and implementation of the present application. The description of the above embodiments is only used to help understand the method and core idea of the present application. Further, for those skilled in the art, based on the idea of the present application, there will be changes in the specific implementation and the scope of the present application. In summary, the content of the present specification should not be construed as a limitation on the present application.

What is claimed is:
1. A display device, comprising:
a housing;
a flexible display screen arranged in the housing;
a keyboard assembly located between the housing and the flexible display screen, wherein the keyboard assembly comprises a driving component and a keyboard component, and the flexible display screen and the keyboard component are fixedly connected;

wherein the keyboard component is arranged up and down in the housing along a light emitting direction of the flexible display screen through the driving component;

wherein the keyboard component comprises a keyboard board and a plurality of elastic keyboards arranged on the keyboard board;

wherein the flexible display screen comprises a plurality of typing parts corresponding to the elastic keyboards, and the elastic keyboards are connected to the typing parts;

wherein the driving component comprises a plurality of lifting struts and a plurality of driving parts, and the driving parts correspond to the lifting struts one-to-one;

wherein the driving part comprises a motor and a first gear, and the motor drives the first gear to rotate around a central axis;

wherein the driving part further comprises a second gear, the second gear meshes with the first gear, and an output end of the motor is connected with a center of the second gear;

wherein the second gear is arranged in parallel with the keyboard board, a limiting piece is arranged on a side surface of the second gear close to the keyboard board, and the limiting piece is pressed on the first gear.

2. The display device according to claim 1, wherein the elastic keyboards and the typing parts are arranged up and down in the housing along the light emitting direction of the flexible display screen through the driving component.

3. The display device according to claim 2, wherein the elastic keyboard comprises a keyboard housing and an elastic component arranged in the keyboard housing.

4. The display device according to claim 3, wherein a first end of the keyboard housing is connected with the keyboard board, and a second end of the keyboard housing is opened and connected with the typing part.

5. The display device according to claim 3, wherein the elastic keyboard further comprises a pressing piece arranged in the keyboard housing.

6. The display device according to claim 5, wherein a first side surface of the pressing piece is fixedly connected to the typing part, and a second side surface of the pressing piece is fixedly connected to the elastic component or the keyboard housing.

7. The display device according to claim 1, wherein the lifting struts are located on a side of the keyboard board away from the flexible display screen.

8. The display device according to claim 7, wherein a first end of the lifting strut is connected with the keyboard board, and a second end of the lifting strut is connected with the driving part.

9. The display device according to claim 8, wherein the lifting strut is arranged up and down along the light emitting direction of the flexible display screen under an action of the driving part.

10. The display device according to claim 1, wherein the lifting strut comprises a threaded rod, a threaded hole is provided in a center of the first gear, and the threaded rod is threadedly fitted with the threaded hole.

11. The display device according to claim 1, wherein the flexible display screen comprises a first plane part, a second plane part, and a bent part connecting the first plane part and the second plane part.

12. The display device according to claim 11, wherein the housing comprises a first housing corresponding to the first plane part, a second housing corresponding to the second plane part, and an intermediate housing connected to the first housing and the second housing and corresponding to the bent part.

13. The display device according to claim 12, wherein the typing part is located in the first plane part or the second plane part.

14. The display device according to claim 13, wherein edges of the intermediate housing close to the first housing and the second housing are set as arc-shaped surfaces.

* * * * *